Dec. 28, 1965   M. M. VAYDA ETAL   3,226,097
MIXER
Filed Sept. 13, 1963   4 Sheets-Sheet 1

INVENTORS
M. MARK VAYDA, JR.,
CHARLES B. DARLEY,
W. PAUL JENSEN and
ROLAND T. TALTON, JR.

BY  *Tipton D. Jennings*
ATTORNEY

INVENTORS
M. MARK VAYDA, JR.,
CHARLES B. DARLEY,
W. PAUL JENSEN and
ROLAND T. TALTON, JR.

BY Tipton D Jennings
ATTORNEY

Dec. 28, 1965   M. M. VAYDA ETAL   3,226,097
MIXER
Filed Sept. 13, 1963   4 Sheets-Sheet 3

INVENTORS
M. MARK VAYDA, JR.,
CHARLES B. DARLEY,
W. PAUL JENSEN and
ROLAND T. TALTON, JR.

BY *Tipton D. Jennings*
ATTORNEY

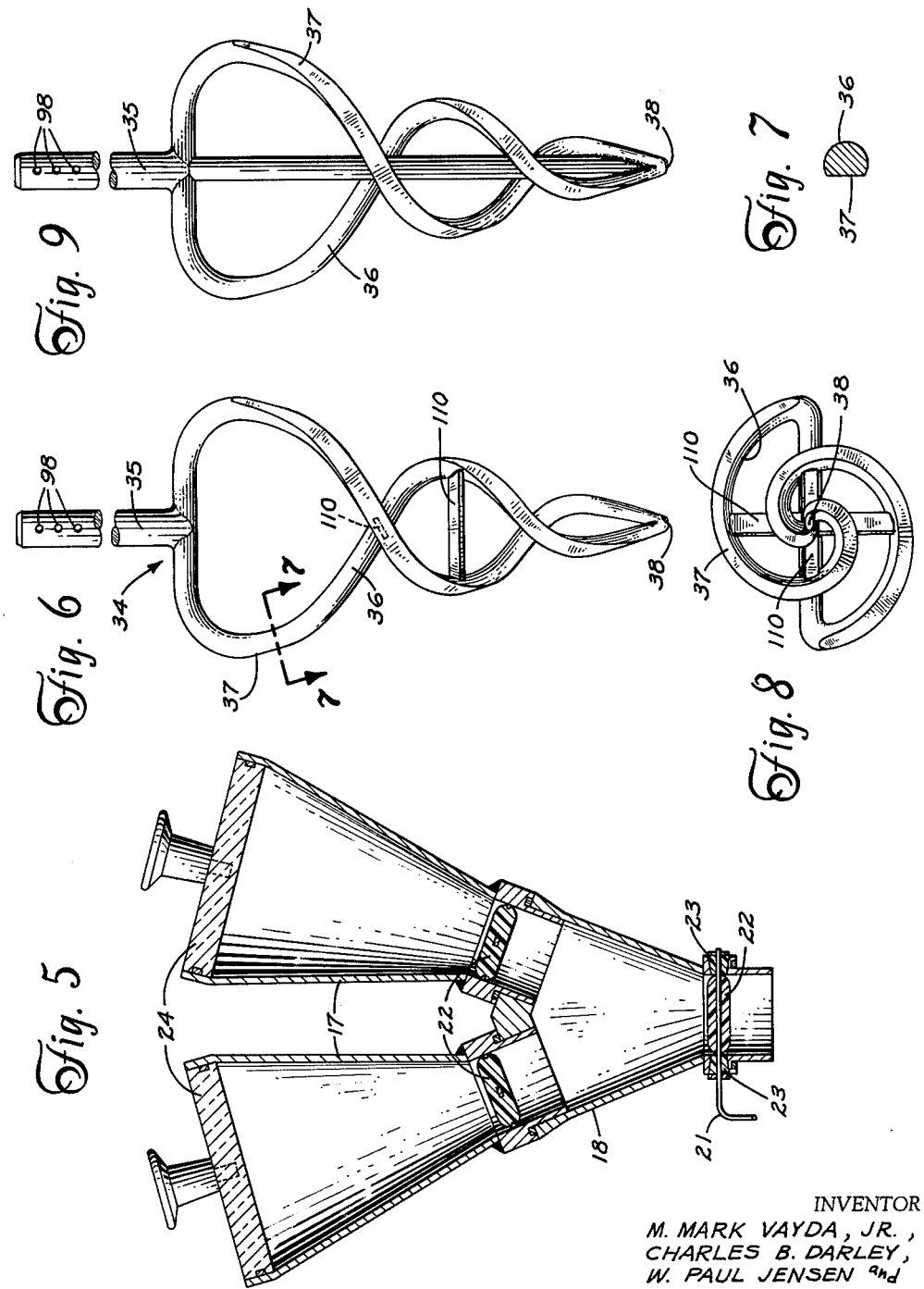

United States Patent Office

3,226,097
Patented Dec. 28, 1965

3,226,097
MIXER
Michael Mark Vayda, Jr., Arlington, Charles B. Darley and William Paul Jensen, Springfield, and Roland T. Talton, Jr., Falls Church, Va., assignors to Atlantic Research Corporation, Fairfax, Va., a corporation of Virginia
Filed Sept. 13, 1963, Ser. No. 308,764
16 Claims. (Cl. 259—41)

This invention relates broadly to mixing apparatus of general application and more particularly to mixing apparatus of the type which provides versatility and safety in the mixing and discharging of difficult- and dangerous-to-handle ingredients.

The object of this invention is to provide mixing apparatus having new and improved mixing blades and mixing receptacle.

Another object of the invention is to provide a mixer having a readily controllable shear rate and reproducible mixing characteristics for variable batch sizes of the ingredients which are mixed.

A further object of this invention is the provision of a mixer which effects rapid and total dispersion of the ingredients in a minimum mixing time.

Still another object of our invention is to provide a mixer void of metal-to-metal contact between the blades and the mixing receptacle and between the blades themselves, thereby reducing the chance of detonating explosive ingredients in the mix.

Still a further object of the invention is the provision of a mixer capble of remote operation during the complete cycle of loading, mixing and discharging the ingredients.

Another object is to provide a mixer which can be completely disassembled and reassembled in a short time, permitting simple and thorough cleaning and avoiding contamination between subsequent batches of mix.

These and other objects, advantages and features of this invention will become apparent from the following detailed description and accompanying drawings in which:

FIGURE 5 is a sectional view of detail taken along line 5—5 of FIGURE 3.

FIGURE 6 is a longitudinal view of a modification of the mixing element of FIGURES 2 and 3.

FIGURE 7 is a sectional view of a detail taken along line 7—7 of FIGURE 6.

FIGURE 8 is an end view of the mixing element of FIGURE 6.

FIGURE 9 is a longitudinal view of another embodiment of the mixing element.

Figure 1:
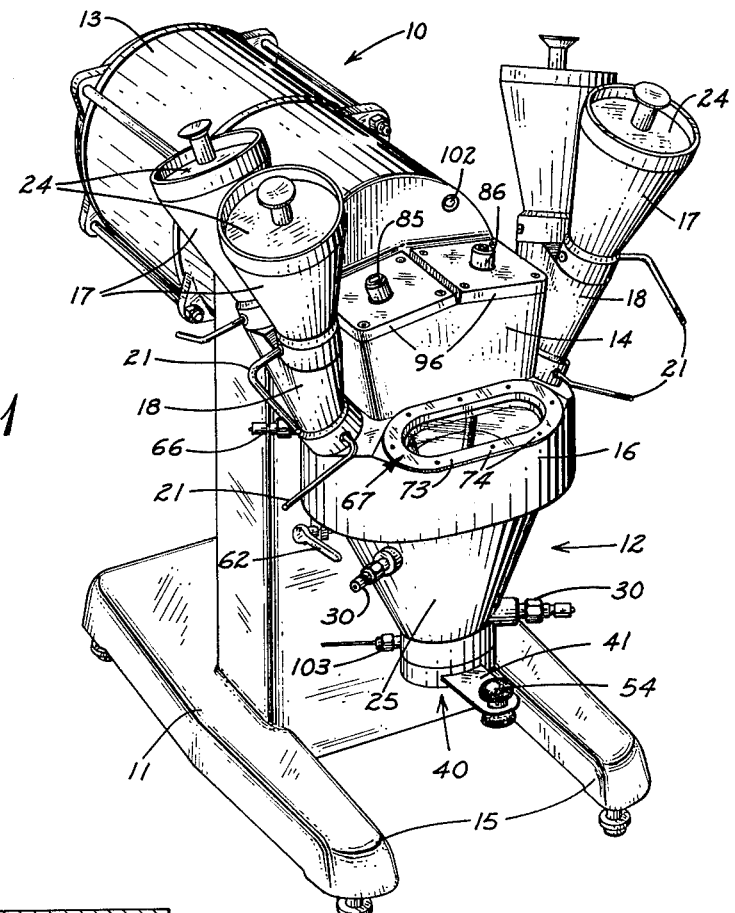
FIGURE 1 is a perspective view of the complete assembly of base, motor, gear box, mixer and hoppers.
Figure 4:
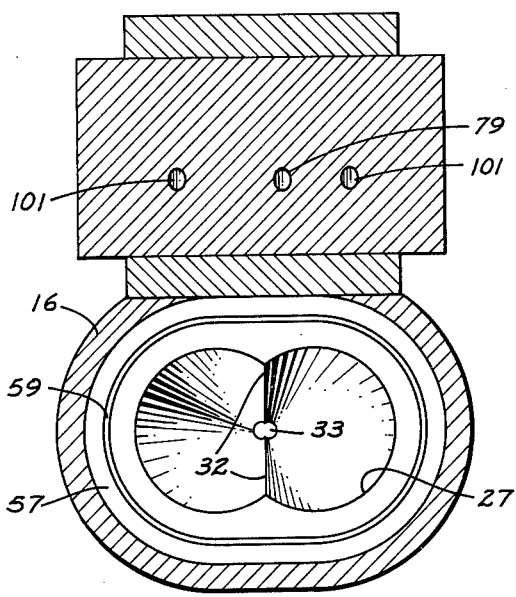
FIGURE 4 is a sectional plan view taken along line 4—4 of FIGURE 2 with the mixing elements removed.

Broadly speaking, the invention provides a mixing apparatus which includes a hollow receptacle having an interior surface in the shape of at least two inverted, intersecting cones whose axes are inclined downwardly and inwardly, and at least two synchronized interdigitating mixing blades, one positioned in each of the intersecting cones. Each blade has two downwardly-convergent helical strips which generate a substantially conical surface when the blade is rotated.

The utilization of mixing apparatus having the aforementioned configuration and relationship of the mixing elements and mixing receptacle provides advantages which heretofore have not been obtainable. The tangential speed of the helical strips of the mixing blades is substantially inversely proportional to the depth of the mix batch. This compensates for the increased pressure toward the bottom of the mix, minimizes frictional forces and overcomes the inherent undesirable excessive rotational stress on the lower portions of cantilever type mixing blades, e.g., those used in can type mixers, having substantially constant radii of gyration along the axis of the blade. Consequently, since these stresses have been minimized, there is less chance of deformation of the blades from a predetermined rotational path. This permits reproducible mixing characteristics over any batch size within the limits of the volume of the mixing receptacle. The lack of deformation in the mixing blades further permits extremely fine control and uniformity in the blade-to-blade and blade-to-wall clearances and, consequently, the ability to accurately vary the shearing forces within the receptacle.

The use of a mixing chamber whose inner surface has the configuration of at least two inverted intersecting cones offers the maximum volume per unit area of surface within the chamber. This minimizes residue and simplifies cleanup operations. In addition, the heat transfer surface area per unit volume within the chamber increases inversely with depth. This permits the largest proportional transfer of heat between the mix and the chamber walls at the lower portions of the chamber where the heat of mix is most concentrated in all vertical mixers.

Referring now in detail to the several figures, the mixing unit which as a whole is designated by the figure 10 includes a base 11, upon which is mounted in elevated relationship the mixer 12, motor 13 and gear box 14, the latter containing the gear assemblage by means of which the mixer is driven from the motor. The base 11 has two forwardly-extending feet 15, spaced to provide greater clearance to the discharge port of mixer 12. For loading the mixer 12 a hopper assembly is provided which includes hoppers 17 detachably and sealingly mounted onto the top of hopper adapters 18 by a friction fit. The adapter 18 is shown detachably and sealingly mounted onto the loading chamber 16 of mixer 12, and is also retained in place by a friction fit. The provision of hopper adapters 18 permits a plurality of ingredients to be introduced through loading ports 19. If desired, a single hopper 17 can be mounted in one of the loading ports 19 and this interchangeability of the hoppers and adapters allows one, two, three or four hoppers to be used concurrently. In the absence of a hopper 17 or adapter 18, a cap 20 is used to sealingly plug loading ports 19. Levers 21 are connected to Teflon butterfly valves 22 within the throat of each hopper and adapter to control through rotation of the valves 22 the metering of the ingredients into the loading chamber 16 and mixing bowl 25 either before or during the mixing. The levers 21 are journaled in tapered Teflon bearings 23 sealingly wedged into the throat walls of the hoppers and adapters. Within the butterfly valves 22, the levers 21 are formed square in cross-section for ease in turning the valves. The hoppers 17 are closed at the top by lids 24 having an O-ring surrounding the lid edge which contacts and seals the upper end of the hopper structure.

The mixing bowl 25 is made with an outer jacket 26 spaced from the wall 27 of the mixing chamber 28 to provide a chamber for the circulation of a fluid heating or cooling medium in heat exchanging relation to the wall 27 of the mixing chamber 28. Spacers 29 give rigidity and strength to the bowl structure while still permitting circulation of fluid. Coupling nipples 30 are screwed into bores 31 formed in the opposite sides of the bowl 25 for coupling to flexible hoses, not shown, which deliver and take away the cooling or heating fluid, as the case may be. The nipples 30 preferably contain a conventional check valve, not shown, such as a spring-biased ball which is pushed open by the hose coupling when connected to permit the flow of fluid through the fluid chamber but which automatically closes upon removal of the hoses to maintain the chamber filled with fluid.

The internal walls 27 of bowl 25 define the single mixing chamber or receptacle 28 and are formed by two intersecting, inverted hollow right cones whose longitudinal axes are inclined at equal angles from the vertical. The intersection of the two cones occurs in a vertical plane and forms a common opening throughout the lengths of the cones, which opening is defined by cusps 32. The interior surface of the receptacle 28 has the shape of the nonoverlapping peripheral portions of the intersecting cones. The cones are truncated to form a discharge port 33 at the bottom of the mixing chamber through which the mix is discharged as hereinafter explained. Since the cones are truncated the extensions of the cone axes intersect below the mixing chamber. The walls 27 are made of a strong material such as stainless steel which is highly polished to prevent adherence of the mix and permits easy and thorough cleaning between mix batches.

Positioned within the chamber 28 but out of contact with the walls 27 are two matched mixing elements 34, preferably made of stainless steel, inclined from the vertical so that they are coaxial with the cones forming the mixing chamber. The elements or beaters 34 are formed with an elongated shank portion 35 and a blade portion 36. The blades 36 are each composed of two strips which extend in opposite directions away from the shank 35 and then form downwardly-convergent helices having a 360° twist throughout their length and which meet at a common point constituting the blade tip 38. Each helix is preferably made flat on the outer or leading edge 37 while the trailing edge is preferably rounded or curved. Each blade 34 when rotated generates a right conical surface which surface is preferably parallel to the conical wall surface of that portion of the mixing chamber 28 in which the blade is disposed. The spacing or clearance between the two conical surfaces is known as the interface between the blade and wall. Each blade tip 38 is filled in, by welding or other means, above the tip 38 for strength, and the point of the tip 38 is cut off to generate a truncated cone when the blade is rotated. The tips 38 are preferably flattened to reduce the chance of contact with one another during rotation of the blades. The helices in one of the blades 36 are formed as clockwise spirals while the helices of the mating blades are formed as counter-clockwise spirals. For example facing FIGURE 3, the left-hand blade looking down the shank toward the tip is formed with clock-wise spirals from the shank to tip while the right-hand blade is formed with counter-clockwise spirals. When mounted the blades are positioned rotationally 90° out-of-phase with each other so that although their conical outlines intersect causing the spiral strips of the matched blades to interdigitate or interweave, the blades are never in contact.

During operation the blades 36 are synchronized to rotate in opposite directions at identical speeds, for example the left-hand blade rotates counter-clockwise while the right-hand blade rotates clockwise, and their flat leading edges 37 which converge downwardly cause the mix to be continuously driven downwardly at the conical interfaces of the walls 27 and the blades 36. This downward motion at the aforesaid interfaces also forces the mix upwardly through the path of blade interdigitation where the mix is alternately sheared by each blade 36 and directed outwardly to an interface. This motion carries the mix particles through a horizontal "Figure 8" mixing pattern. The trailing edge of the blade strip is curved to cause the mix to follow a streamline as it passes over the blade ribbon, the effect being a flow that is substantially free of turbulence and air entrainment. The tangential velocity of the blades decreases from shank to tip because of the decrease in radius of the helices providing a variable shear rate which is at a maximum at the top of the blade and a minimum at the tip. Therefore, the desired blending movement and enfoldment of the mix becomes proportional to the depth of the mix which enables complete mixing to occur even with maximum mixing volumes in a relatively short period of time. Since the radii of the blades decrease progressively from shank to tip there is less mechanical stress encountered throughout the length of these blades when compared with mixer blades, generally cylindrical in outline, which are found in cylindrical, vertical mixing chambers. By a reduction in stress, the occurrence and the amount of bending moments which the blade might experience and the possibility of blade distortion are both lessened. This then permits the blades to be mounted in the receptacle with less clearance, than would normally be the case, between the blades themselves and between the blades and the walls without fear of contact between these components. A reduction in clearance increases the shear rate at a given blade speed and the reduced clearance obtainable here permits the attaining of desired shear rates at lower blade speeds. To insure complete and efficient mixing, it is preferred that the level of the ingredients loaded into the mixing chamber 28 is not above the top of the blades 36. Even when the chamber is filled to this preferred maximum level there is still a substantial volume of cavity above the mix in the mixing and loading chambers which allows froth-forming mixes sufficient volume for expansion without seeping or seething around the gear shaft seals.

Figure 2:
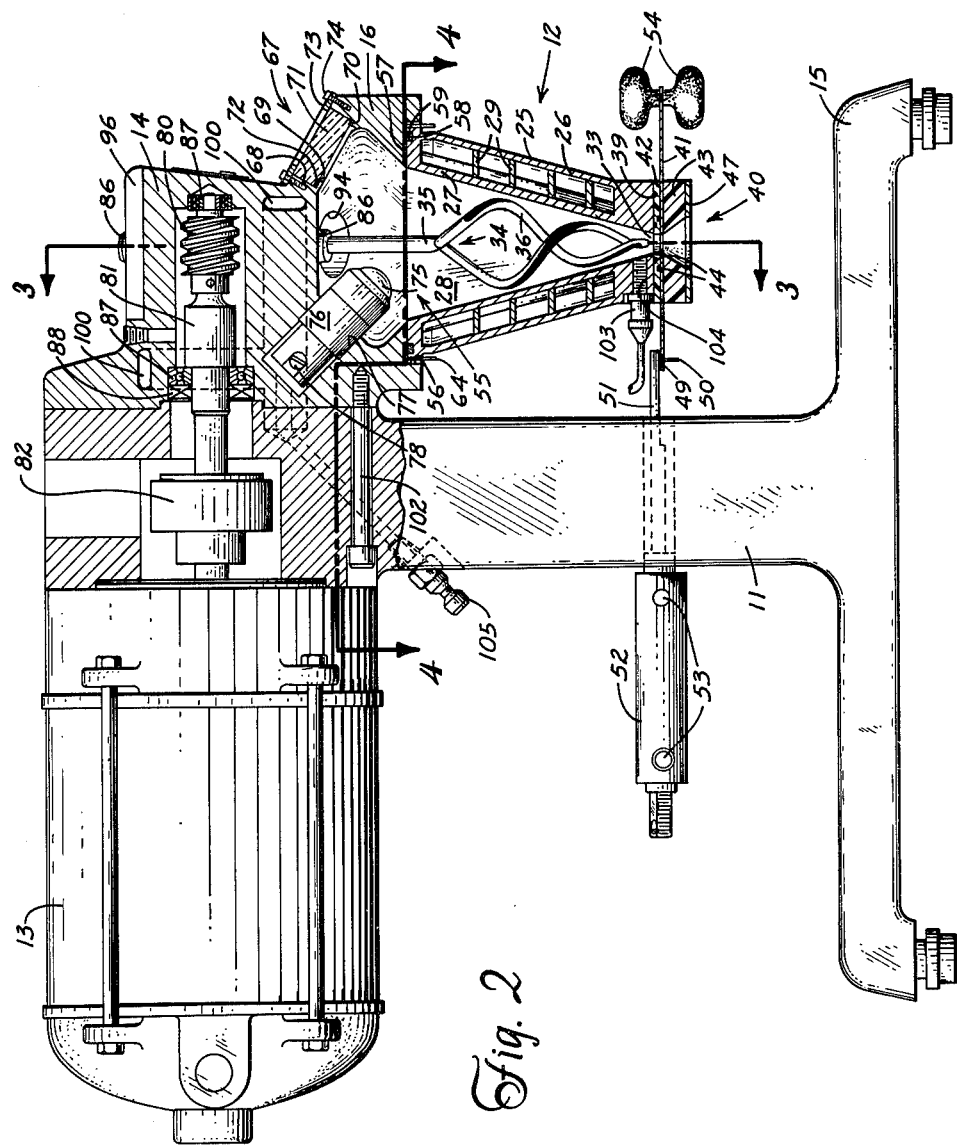
FIGURE 2 is a longitudinal vertical section of the mixer.
Figure 3:
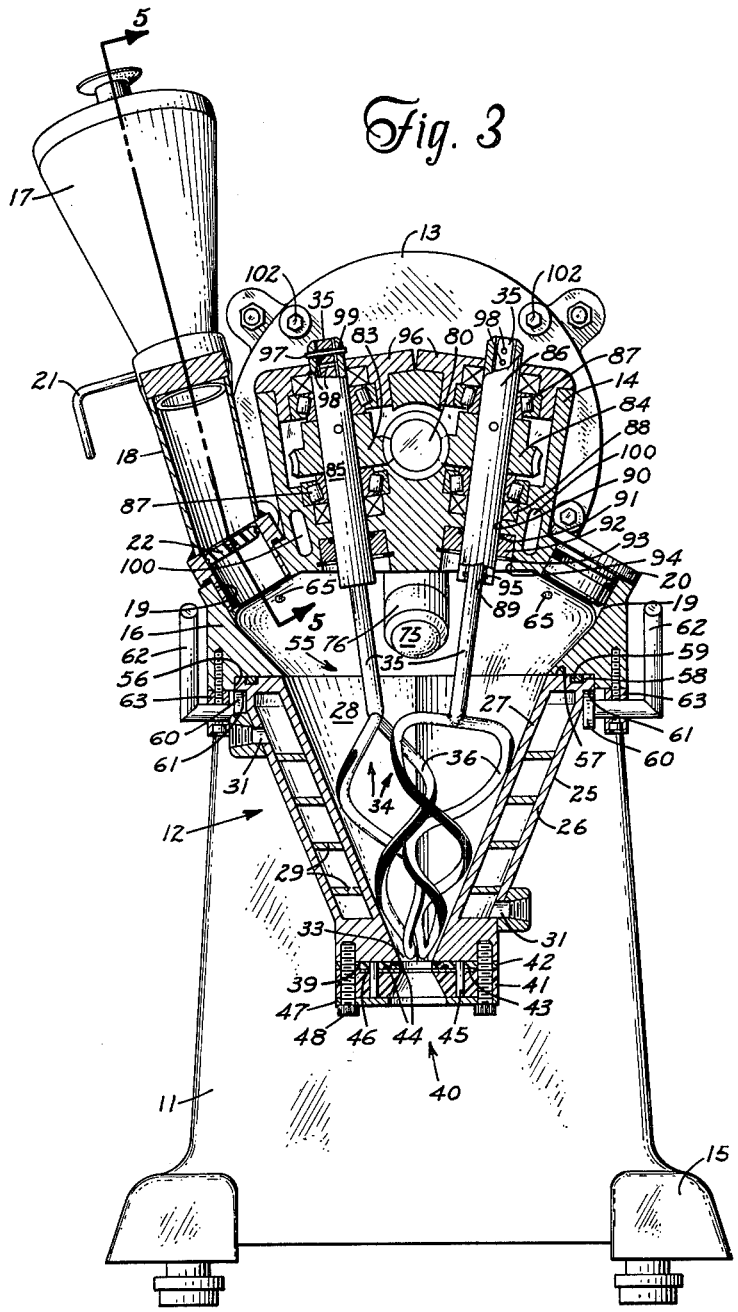
FIGURE 3 is a vertical sectional view taken along line 3—3 of FIGURE 2.

FIGURES 6 and 8 show a modification of the type of blade 36 shown in, for example, FIGURES 2 and 3, in which members 110 are attached, as by welding, to each of the helical strips of the blade. These members 110 are canted or tilted lengthwise at an angle, preferably about 30° to 40°, as clearly shown in FIGURE 6. In addition to providing reinforcement for the helical strips of the blade, and additional shearing surfaces, the members provide an additional mixing action as a result of their tilt. As the blades rotate during mixing operations, approximately one-half of the member pushes the ingredients in the mixing receptacle upwardly while the other half pushes them downwardly.

FIGURE 9 shows another modification of the blade 36 in which the shank 35 extends through the center of the helices to the tip 38 of the blade. If desired, a considerable portion of the area between the helices and above the tip can be filled in with, for instance, sheet metal, for additional reinforcement. This blade, although it is slightly more difficult to clean, provides additional shearing surfaces between the shank of one blade and the helices of the other and improves the blending and mixing of the mix ingredients.

The mixing bowl 25 is formed with a planiform lower face 39 in the center of which is located the discharge port 33 of the mixing chamber 28. Discharge of the mix is permitted when the opening of knife 41 in the discharge valve, indicated generally by numeral 40, is moved into communication with the discharge port 33. Knife 41 is sandwiched between Teflon discs 42, 43 and suitably apertured to permit discharge of the mix therethrough. Teflon disc 42 contains recessed O-rings 44 which seal the mixing chamber 28 when the knife opening is out of communication with the discharge port 33. Nylon pegs 45 extend through the knife 41 and discs 42, 43 to permit limited reciprocating movement of knife 41. The pegs 45 fit snugly in suitable holes in the discs but the holes 46 in the knife, through which the pegs 45 extend, are elongated in the direction of movement of the knife to permit the limited movement. The discharge valve 40 also includes cover plate 47 and retaining screws 48 for mounting the assembly tightly onto the planiform face 39 of bowl 25. External of the discharge valve 40, knife 41 is provided with a hole 49 which is engaged by pin 50 on piston 51 when automatic operation of the discharge valve is desired. Piston 51 extends through a drilled passage in the base 11 of the mixing unit 10 and forms a part of conventional air cylinder 52 mounted on the base. Nipples 53 permit attachment of high-pressure air ducts (not shown) for conveying pressurized air to operate the cylinder 52 and thereby retract or extend, as the case may be, piston 51 and consequently bring the opening in knife 41, either into or out of communication with discharge port 33. Knife 41 is also provided with knobs 54 if manual operation of the discharge valve 40 is desired.

When mixing of the ingredients within the mixing chamber 28 has been completed, discharge of the mix is accomplished by opening the discharge valve 40 through manual or automatic movement of knife 41 as just explained. During the discharge operation the blades 36 continue to rotate and the combined action, at the interfaces of blades 36 and walls 27, of the blades 36 pushing the mix downwardly and the converging walls 27 directing the mix toward the imaginary intersection of the axes of the cones causes the mix to be extruded from the mixing chamber 28 through the discharge port 33 and discharge valve 40. Discharge of the mix is complete and is performed in a minimum amount of time.

The bottom of the loading chamber 16 is provided with an opening 55 which communicates with the top of the mixing chamber 28 to enable loading of this latter chamber with the ingredients from hoppers 17 or hopper adapters 18, as discussed heretofore. An oval rabbet 56 circumscribes said opening, in low relief, spaced from the perimeter of said opening. The bowl 25 is formed with a planiform upper face 57 which fits within said rabbet and abuts the bottom of the loading chamber 16. Face 57 contains an annular recess 58 for receiving an O-ring 59 whose purpose is to seal the connection between the loading and mixing chambers when bowl 25 is mounted in place. The bowl is releasably mounted onto loading chamber 16 by cams 60 which engage shoulder 61 of bowl 25. Cams 60 are attached to L-shaped levers 62 which, when rotated, bring the eccentric portion of the cams 60 into engagement with shoulder 61 to firmly mount the bowl 25 in place. The levers 62 are slidably retained in brackets 63 which permits withdrawal of the cams 60 from beneath shoulder 61 to facilitate removal of bowl 25. Guide pins 64 extend from the bottom of loading chamber 16 and are adapted to register and slidably fit into complementary pin holes formed on shoulder 61 to align and guide the bowl during assembly Rearward of the loading ports 19 are found bores 65 which open into the loading chamber. One bore is designed to sealingly accommodate a coupling nipple (not shown) which can be attached by a suitable hose to a fluid ingredient supply for introducing fluid ingredients to the mix either before or during the mixing cycle. A nipple 66 can be attached to the other bore 65 for connecting a flexible hose (not shown) leading to a vacuum pump for drawing a vacuum in the loading and mixing chambers. If mixing is desired under positive pressure the same hose coupled to nipple 66 can be connected to a compressor or other pressurized gas source. It has also been found helpful in discharging high viscosity mixes to connect the hose and nipple 66 to a pressurized inert gas source to aid the extrusion action of the blades 36 and mixing chamber walls 27. The nipples used at these two bores 65 can be of the same type as nipples 30 which sealingly close when the hoses are uncoupled.

The loading chamber 16 is also provided with a viewing port 67 canted to provide visual observation of the ingredients undergoing mixing in chamber 28. The viewing port 67 has an inwardly opening sight glass accommodating bore 68, oval in shape and aligned with a constricted sight opening 69 in the inner end of the viewing port, the oval region of the port bounding the sight opening 69 having an outwardly facing oval stop surface 70. A sight glass 71, constructed with sufficient thickness to withstand the pressure differentials which will be developed across the sight glass during use of the mixer, is seated in the glass accommodating bore 68 and is limited against inward movement by the stop surface 70. The sight glass 71 is cushioned by gasket 72 interposed between the stop surface 70 and the peripheral zone of the sight glass 71, the gasket 72 serving to seal the glass accommodating bore 68. The entire assembly is retained by sight glass retainer 73 held in place by a number of screws 74 ringing the zone immediately adjacent to the periphery of the glass accommodating bore 68.

Positioned in the rear portion of the loading chamber 16 so as not to obstruct the line-of-sight from the mixing chamber through the sight glass is an explosion-proof light 75 for illuminating the interior of the mixer. Light 75 is designed to screw into bushing 76 which is permanently mounted by a press fit into bore 77. Extending rearwardly of bushing 76 are the electrical connectors 78 for light 75 to which leads (not shown) are attached. The leads are carried away to a current source through inclined hole 79 bored through the base 11 of the mixing unit 10 upwardly into communication with the bore 77. Suitable O-ring seals (not shown) are provided at the light 75 and bushing 76 to seal the chambers at these points.

Formed integrally with loading chamber 16 is gear box 14 comprising a casing which houses worm 80. Worm 80 is mounted onto shaft 81 which is connected to the motor 13 through an adjustable slip clutch 82 designed to prevent damage to the mixer in the event of an overload condition. The worm 80 meshes with identical worm gears 83, 84 mounted upon shafts 85, 86, respectively, and drives the worm gears in opposite directions of rotation. The gear shafts 85, 86 are journaled at equal angles from the vertical, the angle being the same as the angle of inclination of the mixing chamber cones whereby the axes of the cones of the mixing blades 36 coincide with the axes of the mixing chamber cones. The various shafts are carried in suitable bearings 87, and oil seals 88 are provided to prevent leakage of oil from the gear box housing.

The gear shafts 85, 86 are formed as tubes having a longitudinal bore 89 and extend into the loading chamber 16 through holes 90 bored in the bottom of the gear box housing. O-rings 91 seal the chambers at the point of entry of the gear shafts, the O-rings being retained by Teflon retainers 92 and snap-rings 93 positioned in counterbores 94. The bores 89 in the gear shafts 85, 86 are sized to slidingly receive the shanks 35 of the mixing elements 34 in a close fit. Each bore 89 contains an O-ring 95 seated at its lower end to seal off the bore from the chambers below. Shafts 85, 86 are preferably of equal length and extend upwardly through suitable bores in bearing caps 96 so that the blade retaining means 97 at their upper ends are accessible from the outside of the mixing unit.

The shanks 35 of the matched pair of mixing units 34 each contain at their upper end a plurality of aligned, spaced transverse bores 98 perpendicular to the blade axis. The location of the bores is critical and must be positioned so that the blades 36 extend equal distances into the mixing chamber 28 when the mixing units are mounted in place. A plurality of bores 98 are provided to permit the blades 36 to be raised or lowered, along their respective axes, and thus vary both the interfacial clearance between the blades and walls 27 and the clearance between the interdigitating helices to permit the blending of ingredients having a wide particle size range. A similar controllable clearance is obtained by interposing shims (not shown) between the planiform upper face 57 of bowl 25 and the bottom of the loading chamber 16. The bores 98 are sized to register with bores 99 formed in the shafts 85, 86, and the retaining means 97, which can be hardened steel pins, are inserted in a very tight fit through the aligned bores 98, 99 in each shank and shaft respectively to retain the blades. The phase alignment of the blades, which in this case is 90° out-of-phase, can be attained during assembly of the gear box by installing the gear shafts so that the hole 99 in one shaft is perpendicular to the hole 99 in the other shaft. Thus when the mixing elements are installed, and the shanks are pinned, the blades will be in 90° phase relationship.

Cooling of the gears and bearings in gear box 14 is obtained by circulating water through channels 100 formed in the body of the gear box to prevent heat build-up during a prolonged mixing cycle. The water is delivered and taken away through inclined holes 101, parallel to and spaced from hole 79, bored through the base 11 of the mixing unit 10 upwardly into communication with the channels 100. The lower end of the holes 101 can be tapped to accommodate nipples 105 for the coupling of water lines. The integral gear box 14 and loading chamber 16 are mounted onto base 11 by five socket-head screws 102, four of the screws being accessible from the exterior of the gear box while the fifth screw can be reached upon removal of the motor 13. The lower portion of the mixing bowl 25 is shown provided with a thermocouple 103 sealingly mounted in tapped bore 104 to monitor the temperature of the mix.

For mixing sensitive ingredients the mixer is capable of remote operation as from behind protective barricades. Mechanical hands can be used to manipulate the levers 21 on the hoppers 17 and adapters 18 to meter the ingredients into the mixing chamber 28. Suitable valves can be operated to supply liquid ingredients through one of the bores 65, to supply water for cooling or heating the mixing bowl 25, and to supply water for cooling the gear box 14. A vacuum pump can be run to draw and maintain a vacuum in the mixing and loading chambers. Electrical switches can be actuated to run the motor 13 or vary its speed, and to turn on light 75. A data recorder can be operated to monitor the output of the thermocouple 103. When mixing is complete, air-valves can be actuated to operate air cylinder 52 permitting discharge of the mix into a suitable receptacle and the mechanical hands can again be used to operate levers 62 to permit removal of the bowl 25 for cleaning the bowl and blades. If desired, a closed circuit television camera can be positioned at the viewing port 67 to permit visual observance of the mixing activity in the illuminated mixing chamber by the remotely-located operating personnel.

As described, the mixer provides rapid and total mixing of ingredients with a maximum of safety against explosions due to the absence of metal-to-metal contact during loading, mixing and discharging of the ingredients. The interior of the loading and mixing chambers is completely sealed through the provision of seals at every connection thus permitting a controllable atmosphere within the chambers. From a practical standpoint, assembly and disassembly have been made relatively simple in order to achieve maximum convenience and mobility in minimum time.

While we have, in the above description disclosed what we believe to be a practical and efficient embodiment of the invention, it will be understood by those skilled in the art that the specific details of construction and arrangement of parts as shown are by way of example and not to be construed as limiting the scope of the invention.

We claim:
1. Mixing apparatus comprising
  (a) a receptacle having a substantially vertical axis and having an interior surface throughout its length in the shape of the nonoverlapping peripheral portions of at least two intersecting cones, the base of each of said cones being displaced upwardly with respect to the apex of each of said cones, the longitudinal axis of each of said cones being inclined with respect to the axis of said receptacle at an angle such that said axes of said cones intersect below the bases of said cones, and
  (b) a plurality of interdigitating mixing blades, at least one mixing blade being rotatably mounted in each of said cones, each mixing blade generating a substantially conical surface during rotation thereof which intersects the conical surface generated by each other of said blades, the apex of said conical surface being adjacent to the bottom of said receptacle.

2. Mixing apparatus as defined in claim 1 wherein said cones are inclined at equal angles with respect to the axis of said receptacle.

3. Mixing apparatus as defined in claim 1 wherein the axis of each of said blades is coaxial with the axis of the respective cone in which said blade is mounted.

4. Mixing apparatus as defined in claim 1 wherein each of said blades comprises at least two downwardly convergent, helical members joined at the apex of said conical surface.

5. Mixing apparatus comprising
  (a) a receptacle having a substantially vertical axis and having an interior surface throughout its length in the shape of the nonoverlapping peripheral portions of at least two intersecting cones, the base of each of said cones being displaced upwardly with respect to the apex of each of said cones, the longitudinal axis of each of said cones being inclined with respect to the axis of said receptacle at an angle such that said axes of said cones intersect below the bases of said cones, said cones being truncated to provide a single discharge port at the bottom of said receptacle,
  (b) valve means positioned at said port for controlling communication within and without said receptacle through said port, and
  (c) a plurality of interdigitating mixing blades, at least one mixing blade being rotatably mounted in each of said cones, each of said mixing blades generating a substantially conical surface during rotation thereof which intersects the conical surface generated by each other of said blades, the apex of said conical surface being adjacent to said port.

6. Mixing apparatus as defined in claim 5 including a casing surrounding and spaced from said receptacle and means to circulate a coolant through the space between said casing and said receptacle.

7. Mixing apparatus as defined in claim 5 wherein the number of said cones and said blades is two and wherein each of said blades comprises at least two downwardly convergent, helical members joined at the apex of said conical surface.

8. Mixing apparatus as claimed in claim 7 including in addition at least one other member attached to each of the helical members, said other member being canted lengthwise.

9. Mixing apparatus as claimed in claim 7 further comprising means for adjusting said blades along their respective longitudinal axes to vary the clearance between the interdigitating helical members of the blades and to vary the clearance between the blades and interior surface of said receptacle.

10. Mixing apparatus as defined in claim 9 wherein said blades include a shaft extending upwardly with respect to said members and wherein said means comprises
  (a) a plurality of axially spaced bores extending transversely through said shaft, and
  (b) a plurality of fastening means, one of said fastening means extending through a corresponding one of said bores in each of said shafts for mounting said blades in said cones to permit relative rotational motion between said blades and said cones and to prevent relative axial translation therebetween.

11. Mixing apparatus as defined in claim 7 wherein said members of one blade spiral clockwise and said members of the other blade spiral counterclockwise.

12. Mixing apparatus as claimed in claim 11 in which said blades are initially positioned in said cones rotationally ninety degrees apart, said blades being designed for opposite directions of rotation about their respective longitudinal axes.

13. A mixing bowl comprising a receptacle having a substantially vertical axis and having an interior surface throughout its length in the shape of the nonoverlapping peripheral portions of at least two intersecting cones, the base of each of said cones being displaced upwardly with respect to the apex of each of said cones, the longitudinal axis of each of said cones being inclined with respect to the axis of said receptacle at an angle such that said axes of said cones intersect below the bases of said cones.

14. A mixing bowl as defined in claim 13 wherein each of said cones is truncated near its respective apex to provide a single discharge port at the bottom of said receptacle.

15. A mixing bowl as defined in claim 13 including a casing surrounding and spaced from said receptacle and means to circulate a coolant through the space between said casing and said receptacle.

16. A mixing bowl as defined in claim 13 including means to provide a predetermined pressure within said receptacle.

References Cited by the Examiner
UNITED STATES PATENTS

| | | | |
|---|---|---|---|
| 617,735 | 1/1899 | Godfrey | 259—6 X |
| 1,967,546 | 7/1934 | Aeschbach | 259—103 |

References Cited by the Applicant
UNITED STATES PATENTS

| | | |
|---|---|---|
| 2,893,709 | 7/1959 | Nauta. |
| 3,133,728 | 5/1964 | Janke. |

FOREIGN PATENTS

| | | |
|---|---|---|
| 1,116,195 | 11/1961 | Germany. |
| 1,120,850 | 12/1961 | Germany. |

WALTER A. SCHEEL, *Primary Examiner.*

J. M. BELL, *Assistant Examiner.*